April 28, 1964          G. HELMRICH          3,130,469

APPARATUS FOR THE SHAPING OF TOUGH GRANULAR SUBSTANCES

Filed May 20, 1960          6 Sheets-Sheet 1

INVENTOR.
GÜNTER HELMRICH

BY

ATTORNEY

April 28, 1964 G. HELMRICH 3,130,469
APPARATUS FOR THE SHAPING OF TOUGH GRANULAR SUBSTANCES
Filed May 20, 1960 6 Sheets-Sheet 2

INVENTOR.
GÜNTER HELMRICH
BY Michael S. Strike
ATTORNEY

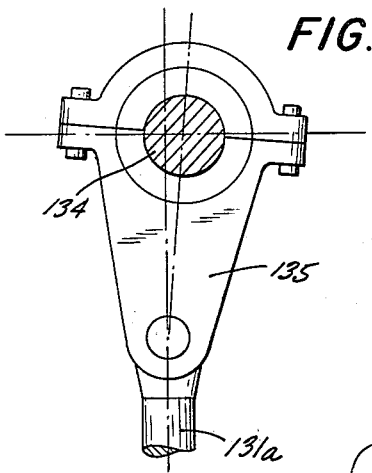
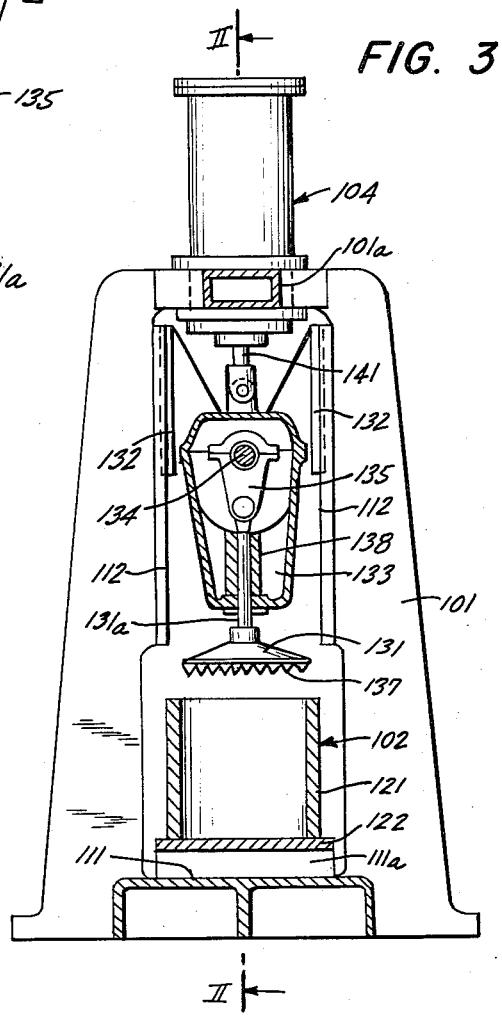

April 28, 1964 G. HELMRICH 3,130,469
APPARATUS FOR THE SHAPING OF TOUGH GRANULAR SUBSTANCES
Filed May 20, 1960 6 Sheets-Sheet 6

INVENTOR.
GÜNTER HELMRICH

BY *Michael S. Striker*

ATTORNEY

United States Patent Office 3,130,469
Patented Apr. 28, 1964

3,130,469
APPARATUS FOR THE SHAPING OF TOUGH
GRANULAR SUBSTANCES
Günter Helmrich, Grevenbroich, Germany, assignor to
Vereinigte Aluminium Werke, Bonn, Germany
Filed May 20, 1960, Ser. No. 30,597
Claims priority, application Germany May 23, 1959
9 Claims. (Cl. 25—41)

The present invention relates to an apparatus for the shaping of granular masses. For example, the apparatus of this invention may be utilized for the production of shaped articles consisting of artificial coal which are subsequently baked and which must be compacted to form homogeneous flawless bodies of uniform density. The starting materials utilized in the practice of my method are of sand-like consistency and of viscous character but cannot be called plastic. The plastic character of such materials becomes more pronounced during the shaping or compacting operation.

Heretofore, such granular masses were transformed into comparatively large shaped articles, i.e. articles with a volume of more than 20 dm.$^3$ and usually between 300 and 1000 dm.$^3$, by shaping the same in large presses or by a stamping process. The compacting of such masses in heavy-duty presses is seldom satisfactory if one desires to obtain an article of acceptable homogeneousness and comparatively high and uniform density because the pressures to which such masses are subjected in a heavy-duty press do not behave as is known in connection with liquids, i.e. the pressure in the interior of the plastic mass is less than along the surfaces which are directly subjected to a compressing action. Therefore, even if the press operates at pressures in the range of between 600 and 1000 kg./cm.$^2$, the density is not uniform throughout the finished product. On the other hand, extrusion presses are suitable only for the production of comparatively simple articles, such as bars of circular cross-sectional contour and the like. However, even if the cross-sectional areas of extruded articles consisting of a tough granular mass, such as artificial coal, certain types of ceramic materials and the like, is comparatively small and even if the extrusion press operates at high pressures of between 100 and 400 kg./cm.$^2$ whose exact magnitude depends upon the temperature of the starting material and upon the cross-sectional area of the extrusion nozzle, the density in the interior of the extruded product is less than at points closer to its surfaces.

Shaped articles of more complicated configuration or those which are produced in small numbers not warranting the manufacture of expensive dies, are usually produced by a stamping process, i.e. by the utilization of manual compacting tools or rammers which are operated by compressed air. However, since the working surfaces of such manual compacting tools are comparatively small, usually in the range of 20 cm.$^2$ or thereabouts, the compacting operation is time-consuming and the final product is seldom of uniform density. The stroke of conventional compacting tools utilized for such purposes is normally about 150 mm. and they operate at about 600 strokes per minute. In order to produce a shaped article of satisfactory density, the compacting tools must be operated by highly skilled persons.

An important object of the present invention is to provide a very simple apparatus for forming shaped articles by compacting in a mold tough, granular masses, such as artificial coal, certain ceramic materials, mixtures of concrete, molding sand, and the like, wherein the mass may be rapidly and conveniently transformed into shaped articles of very satisfactory homogeneousness and of any desired density which is uniform throughout the finished product.

Another important object of the invention is to provide an apparatus of the above outlined characteristics which subjects the mass to comparatively low compacting pressures.

A further object of the invention is to provide an apparatus of the above outlined type which is equally practical for the production of comparatively small as well as for the production of very large and bulky shaped articles.

A concomitant object of the invention is to provide an apparatus for compacting a tough granular mass into the form of shaped articles which is of comparatively simple and lightweight design and which requires comparatively simple and hence cheap molds.

With the above objects in view, the apparatus of my invention comprises an open mold for the mass, one or more tamping instrumentalities which are movable into compressive contact with the exposed surface of the granular mass in the mold, means for reciprocating the tamping instrumentalities and means for maintaining the tamping instrumentalities in uninterrupted compressive contact with the mass until the material in the mold is compacted to requisite density. If the granular mass is to be transformed into a rather bulky shaped article, the material is introduced into the mold in a series of consecutive steps and each newly introduced layer of material is compacted by the tamping instrumentalities before the introduction of a subsequent layer.

The shaped articles produced in the apparatus of my invention may be utilized as converter bottoms, as electrodes for electrical furnaces, prefabricated structural elements, casting molds, and for many other purposes.

It has been found that, quite surprisingly, the apparatus of my invention will produce satisfactory shaped articles by subjecting the granular mass to very low compacting pressures. Thus, the unit pressure at which the tamping instrumentalities bear against the exposed surface of the starting material in an open mold may be in the range of up to 10 kg./cm.$^2$, preferably in the range of between 0.5 and 3 kg./cm.$^2$. In contrast to such low the pressures prevailing in a hydraulic press for the production of similar shaped articles are in the range of between 600 and 1000 kg./cm.$^2$, i.e. the improved apparatus may operate at presssures which constitute only between one-tenth and one-half of one percent of pressures required in a customary press. Consequently, the molds utilized in the apparatus of my invention may be of very simple, lightweight and hence cheap construction, and may be readily taken apart after each compacting operation to permit convenient removal of the shaped article. Despite such very low pressures, the shaped articles produced in my apparatus are of uniform density which is even higher than the density of products obtained in heavy hydraulic or like presses.

It has been found that the tamping instrumentalities need not be reciprocated at a rate higher than 50 strokes per second, preferably at a rate between 10 and 30 strokes per second, and that the length of reciprocatory strokes need not exceed 15 mm. In most instances, the length of strokes performed by the tamping instrumentalities, while in permanent compressive contact with the entire exposed surface of granular material in the mold, need not exceed say 8 mm. and preferably should not be less than about 2 mm.

The open mold preferably consists of several readily separable components and receives one or more tamping members whose tamping surfaces are preferably provided with teeth or serrations to prevent stratification of material in the mold, particularly if the material is introduced in several stages.

For example, the tamping members may be reciprocated by a crankshaft whose cranks are angularly spaced so as to stagger the reciprocatory movements of tamping members. Alternately, the tamping members may be reciprocated by suitable eccentrics or cams, or by an electric or electromagnetic drive. The movements of tamping members toward and away from the open mold may be brought about by a vertically reciprocable threaded spindle, by a fluid operated piston-cylinder arrangement, or by any other suitable assembly which is capable of subjecting the granular mass in the mold to a controlled compacting pressure.

Certain other features of the improved apparatus reside in the provision of means which automatically controls the reciprocation and movements of the tamping members toward and away from the mold, in the provision of means which is adapted to arrest the reciprocatory movements of tamping members when the material is compacted to optimum density, in the provision of means for regulating the frequency and strokes of reciprocatory movements performed by the tamping members, and in the provision of means for varying the pressure at which the tamping members bear against the exposed surface of material in the mold.

The novel features which are considered as characteristic for the invention are set forth in particular in the appended claims. The improved apparatus itself, however, both as to its construction and its method of operation, together with additional features and advantages thereof, will be best understood from the following detailed description of specific embodiments when read in connection with the accompanying drawings, in which:

FIG. 3 is a transverse section taken along the line III—III of FIG. 2, as seen in the direction of arrows;

FIG. 4 is an enlarged view of a connecting rod forming part of the apparatus shown in FIGS. 2 and 3;

Figure 6:
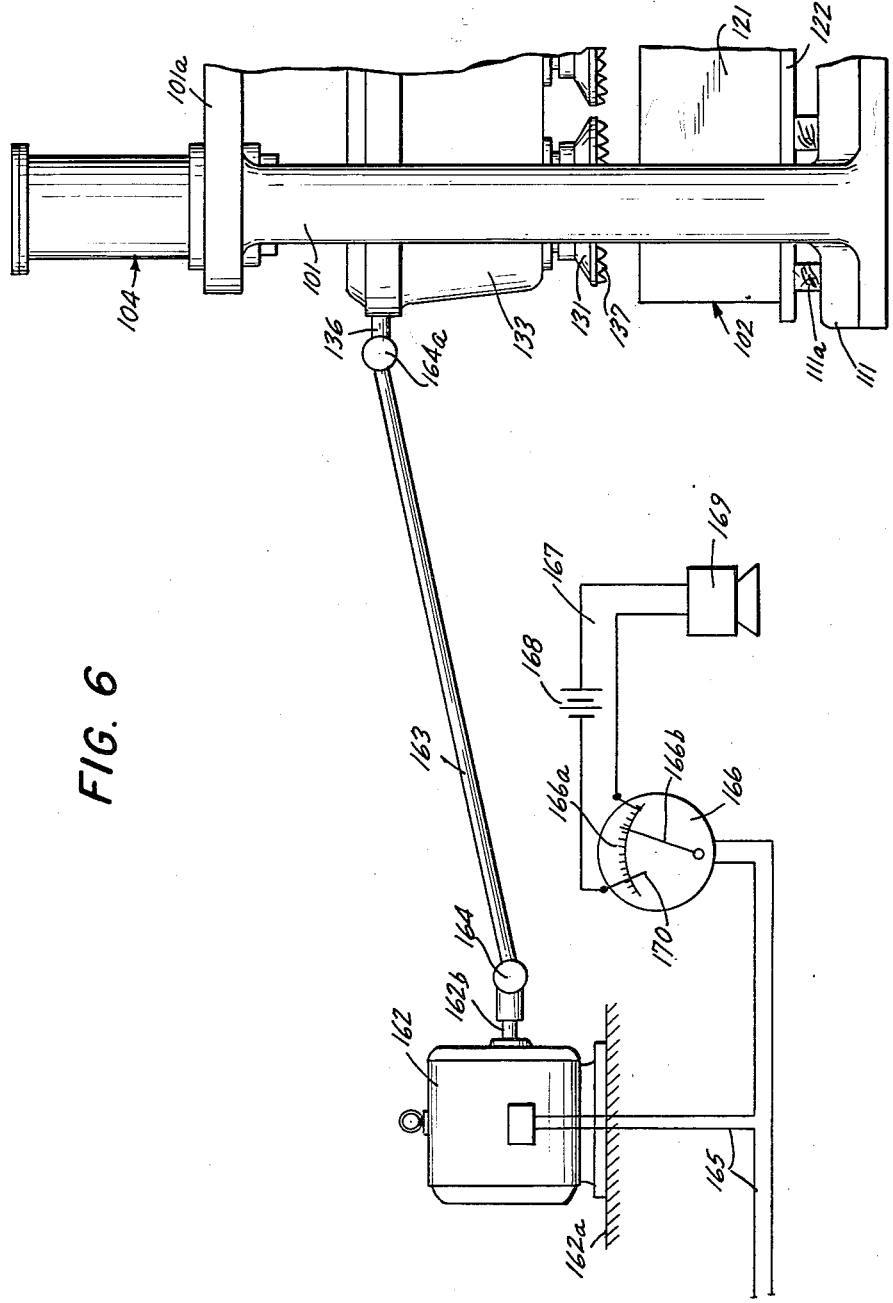
Figure 7:
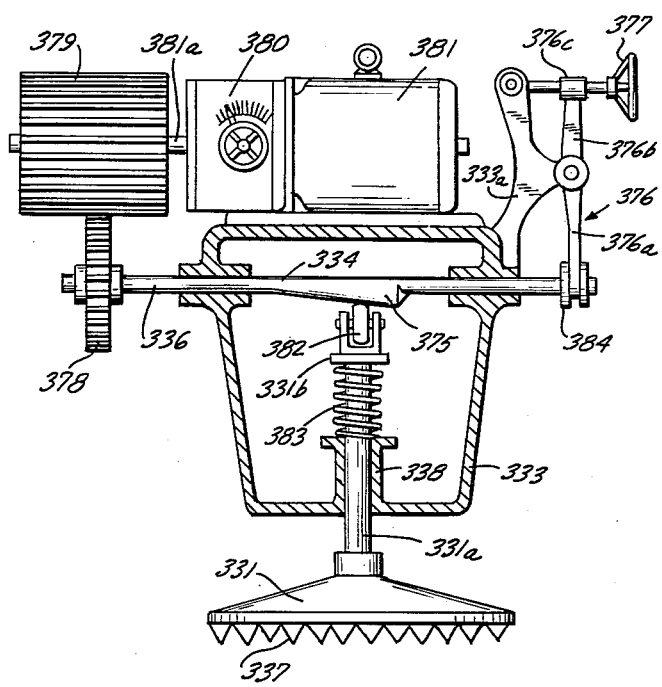

FIG. 6 is a schematic view of an automatic arrangement which determines the resistance offered by treated material to the compacting action of tamping members and which is adapted to arrest the tamping members in response to a given resistance of compacted material; and FIG. 7 is a partly elevational and partly sectional view of modified reciprocating arrangement which is provided with means for controlling the frequency of reciprocatory movements and the length of strokes performed by a tamping member.

Figure 1:
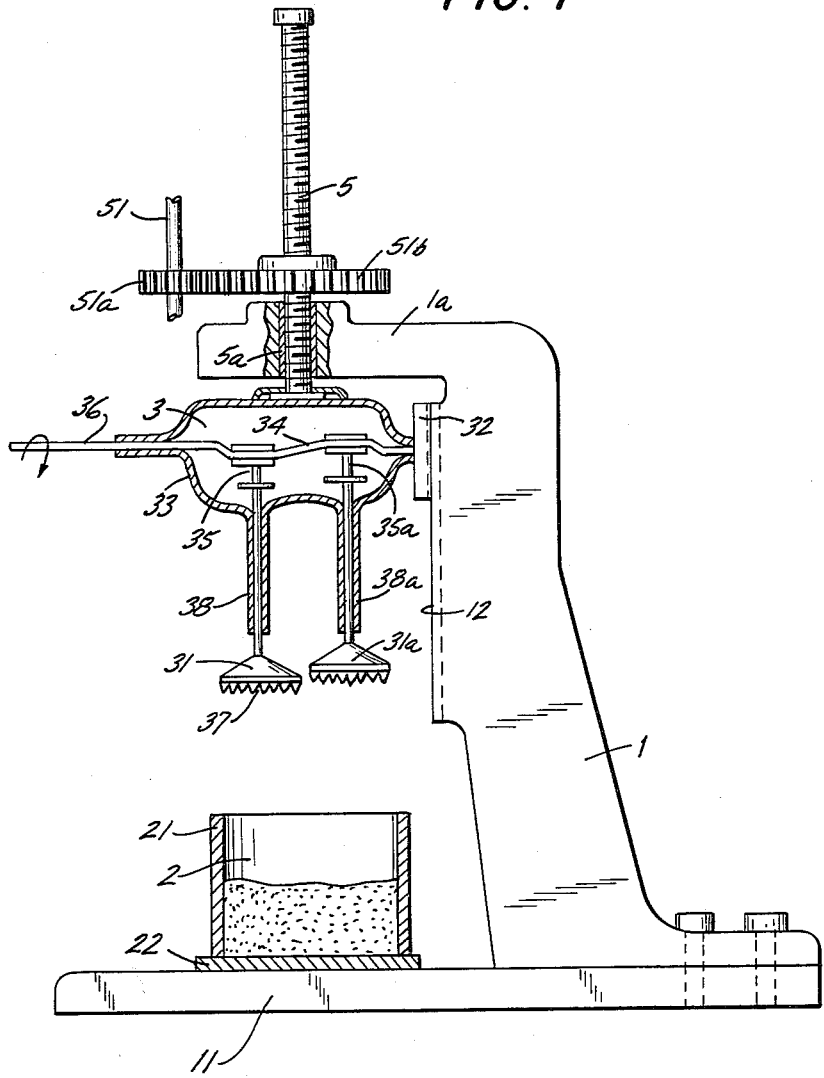
FIG. 1 is a schematic partly elevational and partly sectional view of an apparatus which embodies one form of my invention.

Referring now in greater detail to the illustrated embodiments, and first to FIG. 1, there is shown a tamping machine which comprises an open frame 1 having an upper portion for supporting the actual tamping instrumentalities in the form of two vertically reciprocable tamping members or rams 31, 31a, and a base 11 which supports the open mold 2. This frame which, if necessary, may completely enclose the mold 2 and the tamping members 31, 31a, takes up all stresses which arise in actual operation. The means for reciprocating the tamping members 31, 31a is mounted in a casing 33 connected to and carried by the lower end of a threaded vertical spindle 5, this spindle being rotatably received in a bushing 5a installed in the horizontal arm 1a forming part of the upper frame portion. The spindle 5 is rotatable by a vertical shaft 51 which mounts a pinion 51a meshing with a second pinion 51b, the latter bringing about movements of the spindle 5 downwardly toward the mold 2 or upwardly and away from the mold, depending upon whether the shaft 51 is driven in clockwise or anticlockwise direction.

The mold 2 comprises a plurality of separable components including a separable wall assembly 21 and a bottom plate 22 which latter supports the wall assembly 21 and rests on the base 11. The upper portion of the mold is formed with an opening whose area corresponds to the cross-sectional area of the compartment defined by the wall assembly 21 and the bottom plate 22, i.e. the mold has an open top. Means (not shown) is preferably provided for fixing the bottom plate 22 and the wall assembly 21 in position so that the tamping members 31, 31a will descend through the opening of the mold and into the aforementioned compartment when caused by the spindle 5 to move in downward direction. The casing 33 is guided in its movements toward and away from the mold 2 by guide shoes or rails 32 which are slidably received in vertical ways 12 formed in the frame 1.

The chamber 3 defined by the casing 33 receives a horizontal crankshaft 34 whose left-hand extension 36 projecting from the casing 33 is driven by an electromotor or the like, not shown in FIG. 1. The cranks of the crankshaft 34 mount two connecting rods 35, 35a whose lower ends are articulately connected to the rods of tamping members 31, 31a, respectively. The rods of these tamping members are vertically slidably guided in sleeves 38, 38a extending downwardly from the casing 33.

If the tamping operation is carried out in a series of stages, the apparatus is operated as follows:

In the first step, the mold 2 is partially filled with a trough granular mass to form on the bottom plate 22 a layer of a thickness in the range of between about 150–300 mm. During the introduction of starting material, the casing 33 is moved into its uppermost position which is illustrated in FIG. 1. In the next step, the spindle 5 is caused to descend under the action of the rotating shaft 51 until the tamping members 31, 31a come into compressive contact with the first layer of material in the mold 2 and bear against the material with a specific pressure of say 2 kg./cm.² The motor which drives the crankshaft 34 is then started to reciprocate the tamping members 31, 31a and to thereby tamp the mass of granular material. During such reciprocation, the spindle 5 retains both tamping members in continuous compressive contact with the mass in the mold 2. The strokes of tamping members 31, 31a need not exceed about 3 mm. and the tamping members may be reciprocated at the rate of say 15 strokes per second. As is clearly shown in FIG. 1, the cranks of the crankshaft 34 are staggered and angularly displaced with respect to each other so that the tamping members 31, 31a alternately tamp the granular material layer in the mold 2.

When the first layer of material is plasticized and compacted to requisite density, the shaft 51 is caused to rotate and to move the spindle 5 in upward direction, i.e. back into the position which is shown in FIG. 1 in order to move the tamping surfaces of members 31, 31a upwardly through the opening of and away from the mold 2. A second layer of tough granular mass is introduced on top of the originally introduced and already compacted layer, whereupon the tamping operation is repeated in the above described manner. The procedure is the same before, during and after the introduction of a third, fourth, etc. layer until the compacted article in the mold 2 attains a desired height.

As is shown, the undersides or tamping surfaces of members 31, 31a are formed with preferably pyramidal teeth 37 which prevent a stratification of the subsequently introduced layers.

The finished article may be readily removed upon separation of the wall assembly 21 and, if desired, its uppermost portion with a thickness of say 50 mm. may be cut away to obtain a smooth upper surface. Depending on the nature of starting material, the compacted article formed in the mold 2 may remain on the bottom plate 22 for a given period of time to be cooled and/or hardened by exposure to atmospheric air, or to be dried by exposure to elevated temperatures.

It will be seen that I provide a very simple and lightweight tamping machine which is capable of producing compacted articles heretofore obtainable by the use of much heavier, more expensive and bulkier apparatus, such as heavy-duty presses and the like. In addition, the tamping machine operates at pressures which constitute but a fraction of pressures required if similar articles are produced in apparatus of presently known design. For example, a heavy-duty press utilized for the production of shaped articles in the weight range of about 50 kg. will weigh up to and in excess of 80,000 kg. whereas the tamping machine of my invention, weighing about 9,800 kg., may be utilized for the production of shaped articles in the weight range of up to and exceeding 1000 kg. Thus, the savings in space, energy, and material are not only considerable but, in fact, exceed all expectations.

A further very important advantage of the improved apparatus is that the shaped articles may be produced in very simple, light and inexpensive molds, and also that the shaped articles may be readily removed from their molds without requiring special ejector means such as must be utilized in connection with hydraulically operated heavy-duty presses. Known heavy-duty presses utilize heavy steel molds which are very expensive and which cannot be assembled of readily separable components of the type illustrated in the drawing.

*Example*

(1) A shaped article with a height of 500 mm., a length of 340 mm. and a width of 235 mm. was prepared in a hydraulic press which was operated at a specific pressure of 800 kg./cm.$^2$. The starting material utilized in this example was artificial coal in granular form. After completion of the pressing operation, the density of the shaped article was found to be 1.67 g./cm.$^3$.

(2) An identical granular material was transformed into a block with the dimensions as given above by utilizing a manually operable compacting tool of any known design, for example, a rammer operated by compressed air at a pressure of 6 atmospheres, having a stroke of 140 mm. and performing 600 strokes per minute. The density of the shaped article was 1.69 g./cm.$^3$.

(3) The same granular material was processed in an apparatus of the type shown in FIG. 1. Each tamping member had a stroke of 4 mm. and each tamping member was caused to perform 15 strokes per second, the granular mass in the mold having been maintained at a specific pressure of 1.14 kg./cm.$^2$. The density of the shaped article was 1.73 g./cm.$^3$ and, upon examination, it was found that the density was uniform throughout. After baking, the shaped article exhibited a very satisfactory mechanical strength.

The spindle 5 which is utilized for shifting the rams 31, 31a toward and away from the mold 2 also generates the requisite specific pressures at which the tamping members bear against the mass of granular material during a tamping operation. However, it will be readily understood that the spindle 5 may be replaced by suitable fluid operated devices capable of producing controlled pressures of comparatively small magnitude. For example, and if the machine utilizes a hydraulic piston-cylinder arrangement, the latter may be operated with water, oil or with any other suitable hydraulic fluid.

Figure 2:
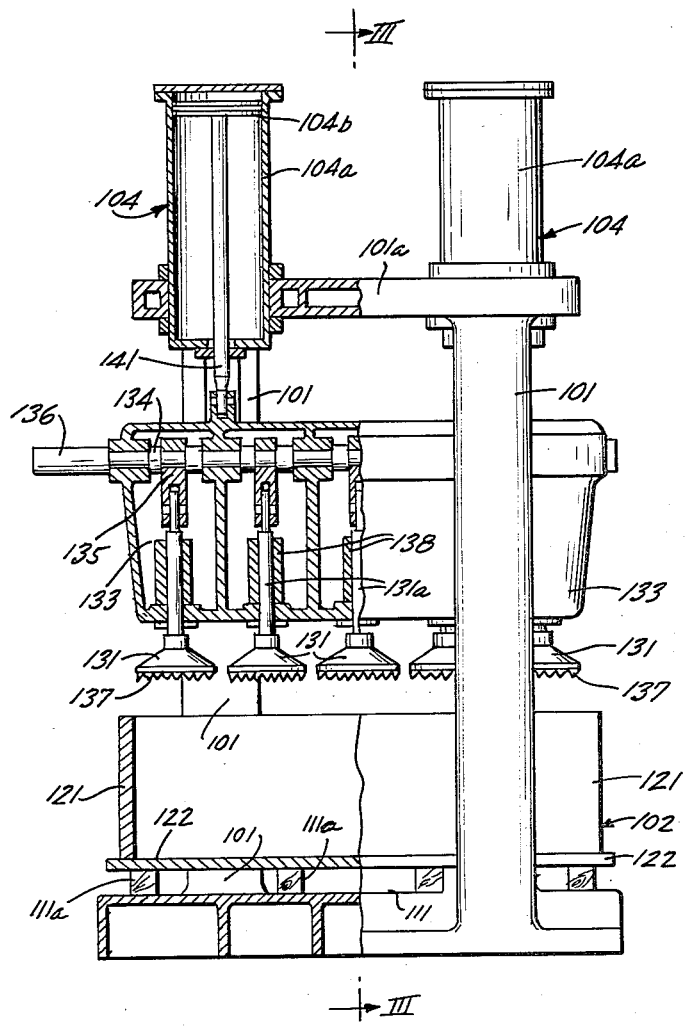
FIG. 2 is a half elevational and half sectional view of a modified apparatus, the section being taken along the line II—II of FIG. 3, as seen in the direction of arrows.

Referring now to FIGS. 2 and 3, there is shown a modified tamping machine which comprises an open frame 101 having an upper portion including a horizontal arm 101a mounting two spaced double-acting pneumatic piston-cylinder arrangements 104 which replace the spindle 5 of the apparatus shown in FIG. 1. The base 111 of the frame 101 supports a composite mold 102 comprising a bottom plate 122 and a separable wall assembly 121 which is placed onto the upper side of the plate 122. The bottom plate rests on spaced beams 111a. It will be seen that the wall assembly 121 encloses a comparatively large compartment and that the machine of FIGS. 2 and 3 comprises five vertically reciprocable tamping members 131. These tamping members are mounted for vertically reciprocating movements in a casing 133 which is formed with sleeves 138 for the rods 131a of the tamping members. The undersides or tamping surfaces of tamping members 131 are again toothed or serrated, as at 137.

A casing 133 is articulately connected to the lower ends of piston rods 141, the upper ends of these piston rods being fixed to the pistons 104b in the cylinders 104a of the respective assemblies 104. The means for delivering compressed air to the cylinders 104a at both sides of the respective pistons 104b is not shown in FIGS. 2 and 3. The compressed air generates the necessary pressure for holding the tamping members 131 in compressive contact with the granular mass in the compartment of the mold 102, and also withdraws the tamping members into the idle position of FIGS. 2 and 3 to permit introduction of granular material into the mold. When the piston rods 141 cause the casing 133 to move toward or away from the mold 102, the casing is controlled by ways 112 which receive guide shoes 132.

The crankshaft 134 which imparts reciprocatory movements to the tamping members 131 is rotatably mounted in the casing 133 and is formed with an extension 136 which projects from the casing and is driven by an electric motor in a manner to be described in greater detail in connection with FIG. 6. The cranks of the shaft 134 mount connecting rods 135 whose lower ends are articulately connected with the upper ends of rods 131a.

Since the compartment in the mold 102 of FIGS. 2 and 3 is comparatively large, the granular mass is preferably introduced in several stages with a thickness of between 150 and 300 mm. while the tamping members 131 and the casing 133 are held by piston rods 141 in the illustrated positions. Compressed air is then introduced at the upper sides of pistons 104b to move the casing 133 in downward direction and to move the tamping surfaces 137 into compressive contact with the upper surface of granular mass in the mold 102. In the next step, the crankshaft 134 is rotated to reciprocate the tamping members 131 so that these members perform strokes of say 6 mm. and at a rate of say 30 strokes per second. Again, the cranks of the shaft 134 are preferably angularly spaced from each other so that the reciprocatory movements of tamping members 131 are staggered and therefore tamp the granular mass in a given sequence. The specific pressure exerted by the fluid in cylinders 104a may be in the range of say 10 kg./cm.$^2$. The operation is then repeated until the shaped article in the mold 102 attains a desired height and a desired density.

It will be understood that, while FIGS. 1 to 3 show a tamping machine which utilizes two or more tamping members, it is equally possible to utilize a single tamping member (see FIG. 7) which then by itself at least nearly covers the entire cross-sectional area of the compartment and the exposed surface of granular mass in the mold 2. The number of tamping members depends on the dimensions of the mold and on the nature of starting material. It has been found that, regardless of the number of tamping members used in my improved tamping machine, it is advisable to provide a rather small clearance say in the range of between 0.1 to 20 mm., and preferably in the range of between about 0.5 and 10 mm., not only between the mold walls and the tamping surfaces of the tamping members but also between the tamping surfaces of the adjacent tamping members. If the apparatus utilizes two or more tamping members it is highly advisable to stagger the reciprocatory strokes of the tamping members so as to prevent undesirable vibrations of the frame 1 which would develop if all the tamping members were reciprocated in the same rhythm, i.e. if two or more members would move downwardly into more pronounced compressive contact with the granular mass at the same time. Of course, the crankshaft 34 represents but one form of means for reciprocating the tamping member or members when the tamping surfaces are in contact with the starting material, and it will be readily understood that the crankshaft may be replaced by other mechanical means, e.g. by suitable eccentrics or cam assemblies (see FIG. 7), or by suitable electric or electromagnetic means of the type shown in FIG. 5. The preferred number of reciprocatory strokes is in the range of between about 10–30 strokes per second, and the number of strokes normally should not exceed 50 and should not be less than 10 per second. The pressure per unit area of starting material in the mold 2 is normally between about 0.1 and 10 kg./cm.², preferably between about 0.5 and 3 kg./cm.². The length of strokes performed by the tamping member or members is in the range of up to 15 mm., preferably between 2 and 8 mm. The mounting of the tamping members is preferably such that these members perform vertical strokes, i.e. as in the embodiments which are shown in the drawings.

The production of shaped articles in several successive stages is resorted to when the desired height of such articles exceeds a given magnitude. As mentioned before, the height of each consecutively introduced layer is preferably in the range of between about 150–300 mm. Whenever the height of a shaped article exceeds say 200 mm., the material is preferably introduced in at least two stages, the number of stages further depending on the nature of starting material and on the desired density of the shaped article. Particularly if the shaped article is formed in a series of consecutive steps, the toothed tamping surfaces 37 of tamping members 31, 31a or 131 prevent the formation of separable strata in that their teeth intermix the material and thereby prevent stratification by preventing the formation of distinct separating surfaces between the successively introduced layers of starting material, e.g. artifical coal, a ceramic mass or the like.

Figure 5:
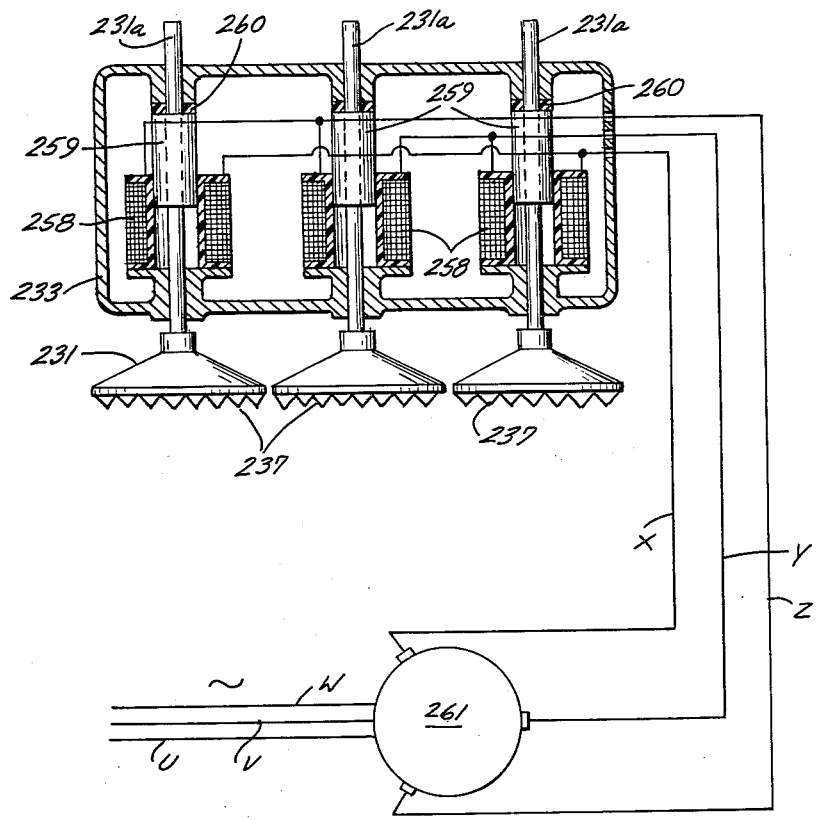
FIG. 5 is an enlarged detail view showing in vertical section the casing of three tamping members and electromagnetic reciprocating means for the tamping members.

FIG. 5 illustrates a further modification of my invention according to which the tamping members are reciprocated by electromagnetic means. The apparatus which is only partly illustrated in FIG. 5 comprises a casing 233 of non-magnetic material and vertically reciprocably guides the rods 231a of three tamping members 231. The toothed undersides of tamping members 231 are indicated by reference numerals 237. Each rod 231a carries an iron core 259 which, when the tamping members are not reciprocated, extends only partly into the windings 258 provided in the interior of the casing 233. In their uppermost positions, the cores 259 abut against stops 260, i.e. the stops 260 maintain the tamping surfaces 237 in compressive contact with the upper surface of the granular mass when the casing 233 is caused to descend by a mechanical, pneumatic or hydraulic reciprocating arrangement which is not shown in FIG. 5. The windings 258 act as solenoids and periodically attract the respective cores 259 as soon as an alternating electric current is permitted to flow through their convolutions to thereby reciprocate the tamping members 231 in a given sequence.

The electric circuit of the windings 259 comprises conductors X, Y, Z which are connected to a frequency changer 261, the latter receiving polyphase alternating current through a system of conductors U, V, W. The frequency changer 261 may vary the number of cycles per second, e.g. to a frequency of 5 to 25 cycles per second which corresponds to 10 to 50 strokes per second. Thus, the device 261 constitutes means for varying the frequency of reciprocatory movements performed by the tamping members 231 while in contact with the upper surface of granular mass during a tamping operation.

A further very important feature of the improved apparatus is that it enables an operator to measure the energy expended for the generation of reciprocatory movements carried out by the tamping members during a tamping operation. At the end of the tamping operation, i.e. when the shaped article attains an optimum density, the resistance offered by the material to the compacting action and hence the energy spent for the generation of reciprocatory movements drops to a given magnitude. By plotting a curve or by otherwise recording the changes in energy requirements of the tamping members, one can determine the exact time when the tamping operation may be terminated. Suitable means may further be provided for automatically adjusting and/or arresting the motor which reciprocates the tamping members as soon as the density of compacted material in the open mold 2 or 102 reaches a given optimum value. Such controlling and arresting means, shown in FIG. 6, may be combined with further means which automatically moves the tamping member or members and their drive in a direction away from the mold as soon as the tamping operation is completed. In other words, the entire operation may be carried out in a fully automatic way.

Referring now to FIG. 6, there is shown an apparatus of the type described in connection with FIGS. 2 and 3, provided with an electric motor 162 which is utilized to drive the extension 136 of the crankshaft in the casing 133. The motor 162 is mounted on a base 162a and its output shaft 162b drives a Cardan shaft 163 which in turn is drivingly connected with the extension 136. Since the casing 133 must reciprocate toward and away from the mold 102, the connections 164, 164a between the Cardan shaft 163 and the parts 162b, 136, respectively, preferably assume the form of universal joints. The means for automatically arresting the motor 162 when the granular mass in the mold 102 offers a given resistance to the tamping action of members 131 comprises a contact wattmeter 166 which is connected in the circuit 165 of the motor 162 and whose graduated scale 166a indicates the motor output required for reciprocating the tamping members 131 during a compacting operation. When the material in the mold 102 is compacted to a certain density, the motor output assumes a constant value which depends on the cross-sectional area of the compartment in the mold 102, on the number of tamping members, and on the composition of compacted material. The wattmeter 166 comprises an adjustable terminal 170 which completes a circuit 167 as soon as the indicator 166b comes into contact therewith, the indicator 166b assuming such position when the motor output reaches a given minimum magnitude. The circuit 167 comprises a source of electric current 168 and a visual or audio alarm device 169 connected in series with the source 168. The alarm device 169 may indicate to the operator that the motor 162 should be arrested or, preferably, this alarm device is connected with the current source in the motor circuit 165 to automatically arrest the motor 162 as soon as the indicator 166b comes into contact with the adjustable terminal 170. For example, such automatic arresting means may comprise a switch in the circuit 165 and a relay of any known design, not shown in FIG. 6.

As is illustrated in FIG. 7, the improved machine may be equipped with means for varying the length and frequency of reciprocatory strokes performed by the individual tamping members, and also for varying the specific pressure at which the tamping members bear against the material in the mold. The reciprocation- and pressure-controlling means may be actuated in a fully automatic way, preferably in response to variations in resistance offered by the mass to further compacting action by the tamping member or members. The apparatus of FIG. 7 is shown only in part and comprises a single tamping member 331 formed with a tamping surface 337 and having a vertically reciprocable rod 331a which is guided in a sleeve 338 forming part of the casing 333. The crankshaft shown in FIGS. 1 to 3 is replaced by a horizontal shaft 334 which is rotatably mounted in the casing 333 and comprises an outwardly projecting extension 336 mounting a driven gear 378 permanently meshing with a longer driving gear 379, the latter being coaxially connected with the output shaft 381a of an electric motor 381. The shaft 334 is formed with a tapering cam 375 and is axially shiftable in the casing 333 so that different portions of the cam 375 may be moved into contact with a friction reducing follower roller 382 rotatably mounted at the upper end of the rod 331a. The follower roller 382 is permanently biased into contact with the cam 375 by a resilient member here shown as a helical spring 383 which operates between the sleeve 338 and a collar 331b provided at the upper end of the rod 331a beneath the follower roller. The shaft 334 may be axially shifted by the forked lower arm 376a of a two-armed lever 376. This lever is articulately connected to a bracket 333a mounted on the casing 333 and has an upper arm 376b which is formed with an internally threaded ring 376c meshing with the externally threaded shaft of an adjusting handwheel 377. The shaft of the handwheel 377 is articulately fixed to the bracket 333a. The forked lower end of the arm 376a is received in an annular groove formed in the periphery of a roller 384 which is connected for rotation with the shaft 334 and may axially displace the latter when the handwheel 377 is rotated in clockwise or anticlockwise direction. Such axial displacements of the shaft 334 move different portions of the tapering cam 375 into engagement with the follower roller 382 to thereby vary the length of strokes performed by the tamping member 331. The length of the driving gear 379 is such that the driven gear 378 remains in permanent mesh therewith regardless of the momentary axial position of the shaft 334.

The frequency of strokes performed by the tamping member 331 may be controlled as follows: The driving motor 381 is operatively connected with an infinitely variable transmission 380 which controls the number of revolutions of driving gear 379 and which may be adjusted to rotate the shaft 334 at a rate of say between 10 and 50 revolutions per second whereby the cam 375 will reciprocate the tamping member 331 at the same frequency. An important advantage of the arrangement shown in FIG. 7 is that the Cardan shaft of FIG. 6 may be omitted and that the driving motor 381 may be mounted directly on the casing 333.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A machine for compacting a tough granular mass into the form of a shaped article which comprises, in combination, a mold formed with opening means and adapted to receive the granular mass; a tamping member extendable through said opening means into compressive contact with the mass in said mold, said tamping member having a tamping surface whose area at least approximates the cross-sectional area of the mold so that the granular mass is substantially completely surrounded when the tamping member extends into said mold; means for reciprocating said tamping member at a predetermined frequency with strokes of predetermined length; and means for maintaining said tamping member in uninterrupted compressive contact with the mass in said mold so that said tamping member transmits to the mass a continuous compressive face during reciprocation thereof.

2. A machine for compacting a tough granular mass into the form of a shaped article which comprises, in combination, a mold formed with opening means and adapted to receive the granular mass; a tamping member extendable through said opening means into compressive contact with the mass in said mold, said tamping member having a tamping surface whose area at least approximates the cross-sectional area of the mold so that the granular mass is substantially completely surrounded when the tamping member extends into said mold; means comprising crank shaft means operatively connected with said tamping member for reciprocating said tamping member at a predetermined frequency with strokes of predetermined length and means for maintaining said tamping member in uninterrupted compressive contact with the mass in said mold so that said tamping member transmits to the mass a continuous compressive force during reciprocation thereof.

3. A machine for compacting a tough granular mass into the form of a shaped article which comprises, in combination, a mold formed with an opening and adapted to receive the granular mass; a tamping unit including a plurality of tamping members each having a tamping surface extendable through said opening into compressive contact with the mass in said mold, the combined area of said tamping surfaces at least approximating the cross-sectional area of said mold so that the mass is substantially completely surrounded when said tamping unit extends into said mold; means associated with said tamping unit for reciprocating said tamping members with substantially equal strokes of predetermined length in timely staggered relation at a predetermined frequency; and means for maintaining said tamping members in uninterrupted compressive contact with the mass in said mold so that said tamping unit transmits to the mass a continuous compressive force during reciprocation of said tamping members.

4. A machine for compacting a tough granular mass into the form of a shaped article which comprises, in combination, a frame comprising a base and an upper portion; a mold supported by said base, said mold having an upper end formed with an opening and adapted to receive the granular mass; a plurality of reciprocable tamping members each having an underside constituting a tamping surface extendable through said opening into compressive contact with the mass in said mold, the combined area of said tamping surfaces at least approximating the cross-sectional area of said mold so that the mass is substantially completely surrounded when the tamping members extend into the mold; means comprising a threaded vertical spindle mounted in the upper portion of said frame for moving said tamping members into said mold and for maintaining said tamping members in an interrupted compressive contact with the mass in said mold so that said tamping members transmit to the mass a continuous compressive force during reciprocation thereof; and means for reciprocating said tamping members at a predetermined frequency with strokes of predetermined length, said reciprocating means comprising a casing carried by said spindle, a horizontal crankshaft rotatably mounted in said casing, connecting rods, one for each tamping member, said connecting rods mounted on said crankshaft and each articulately connected with the respective tamping member for reciprocating the same when said crankshaft rotates, and guide means connected with said casing and slidably engaging with the frame for controlling the movements of said tamping members toward and away from said mold.

5. A machine for compacting a tough granular mass into the form of a shaped article which comprises, in combination, a mold formed with opening means and adapted to receive the granular mass; a tamping member extendable through said opening means into compressive contact with the mass in said mold, said tamping member having a tamping surface whose area at least approximates the cross-sectional area of the mold so that the granular mass is substantially completely surrounded when the tamping member extends into said mold; means for reciprocating said tamping member at a predetermined frequency with strokes of predetermined length; means for adjusting the frequency of said strokes; and means for maintaining said tamping member in uninterrupted compressive contact with the mass in said mold so that said tamping member transmits to the mass a continuous compressive face during reciprocation thereof.

6. A machine for compacting a tough granular mass into the form of a shaped article which comprises, in combination, a mold formed with opening means and adapted to receive the granular mass; a tamping member extendable through said opening means into compressive contact with the mass in said mold, said tamping member having a tamping surface whose area at least approximates the cross-sectional area of the mold so that the granular mass is substantially completely surrounded when the tamping member extends into said mold; means for reciprocating said tamping member at a predetermined frequency with strokes of predetermined length; means for determining the resistance offered by the mass to the compacting action of said tamping member; means operatively connected with said last mentioned means for automatically controlling the operation of said reciprocating means; and means for maintaining said tamping member in uninterrupted compressive contact with the mass in said mold so that said tamping member transmits to the mass a continuous compressive face during reciprocation thereof.

7. A machine for compacting a tough granular mass into the form of a shaped article which comprises, in combination, a mold formed with opening means and adapted to receive the granular mass; a tamping member extendable through said opening means into compressive contact with the mass in said mold, said tamping member having a tamping surface whose area at least approximates the cross-sectional area of the mold so that the granular mass is substantially completely surrounded when the tamping member extends into said mold; means for reciprocating said tamping member at a predetermined frequency with strokes of predetermined length; means for determining the resistance offered by the mass to the compacting action of said tamping member; means operatively connected with said last mentioned means for automatically controlling the operation of said reciprocating means; and means for maintaining said tamping member in uninterrupted compressive contact with the mass in said mold so that said tamping member transmits to the mass a continuous compressive force during reciprocation thereof.

8. A machine for compacting a tough granular mass into the form of a shaped article which comprises, in combination, a mold formed with an opening and adapted to receive the mass; a reciprocable tamping member extendable through said opening into compressive contact with the mass in said mold, said tamping member having a tamping surface whose area at least approximates the cross-sectional area of the mold so that the granular mass is substantially completely surrounded when the tamping member extends into said mold; means comprising a piston-cylinder arrangement for maintaining said tamping member in uninterrupted compressive contact with the mass in said mold so that said tamping member transmits to the mass a continuous compressive force during reciprocation thereof; and means for reciprocating said tamping member at a predetermined frequency with strokes of predetermined length while said piston-cylinder arrangement maintains the tamping member in uninterrupted compressive contact with the mass.

9. A machine for compacting a tough granular mass, such as artificial coal, into the form of a shaped article which comprises, in combination, a mold formed with an opening and adapted to receive the granular mass; a tamping member extendable through said opening into compressive contact with the mass in said mold, said tamping member having a tamping surface whose area at least approximates the cross-sectional area of the mold so that the granular mass is substantially completely surrounded when the tamping member extends into said mold; means for reciprocating the tamping member at a predetermined frequency with strokes of predetermined length; and means for maintaining said tamping member in uninterrupted compressive contact with the mass in said mold so that said tamping member transmits to the mass a continuous compressive force during reciprocation thereof.

References Cited in the file of this patent

UNITED STATES PATENTS

| | | |
|---|---|---|
| 450,521 | Mistelski | Apr. 14, 1891 |
| 981,928 | Kramer | Jan. 17, 1911 |
| 938,367 | McHench | Apr. 4, 1911 |
| 1,107,976 | McCoy | Aug. 18, 1914 |
| 1,164,726 | Kramer | Dec. 21, 1915 |
| 1,551,394 | Hunter | Aug. 25, 1925 |
| 1,671,325 | Straub | May 29, 1928 |
| 1,937,028 | Lux et al. | Nov. 28, 1933 |
| 2,341,012 | Billman et al. | Feb. 8, 1944 |
| 2,366,780 | Gelbman et al. | Jan. 9, 1945 |
| 2,541,981 | Babcock | Feb. 20, 1951 |
| 2,542,485 | Demo | Feb. 20, 1951 |
| 2,980,978 | Marshall | Apr. 25, 1961 |

FOREIGN PATENTS

| | | |
|---|---|---|
| 539,797 | Canada | Apr. 23, 1957 |
| 359,368 | France | Mar. 24, 1906 |
| 511,247 | France | Sept. 22, 1920 |